May 13, 1924.  
L. R. ROBBINS  
1,494,021  
METHOD OF AND APPARATUS FOR PRODUCING INGOTS  
Filed April 8, 1920
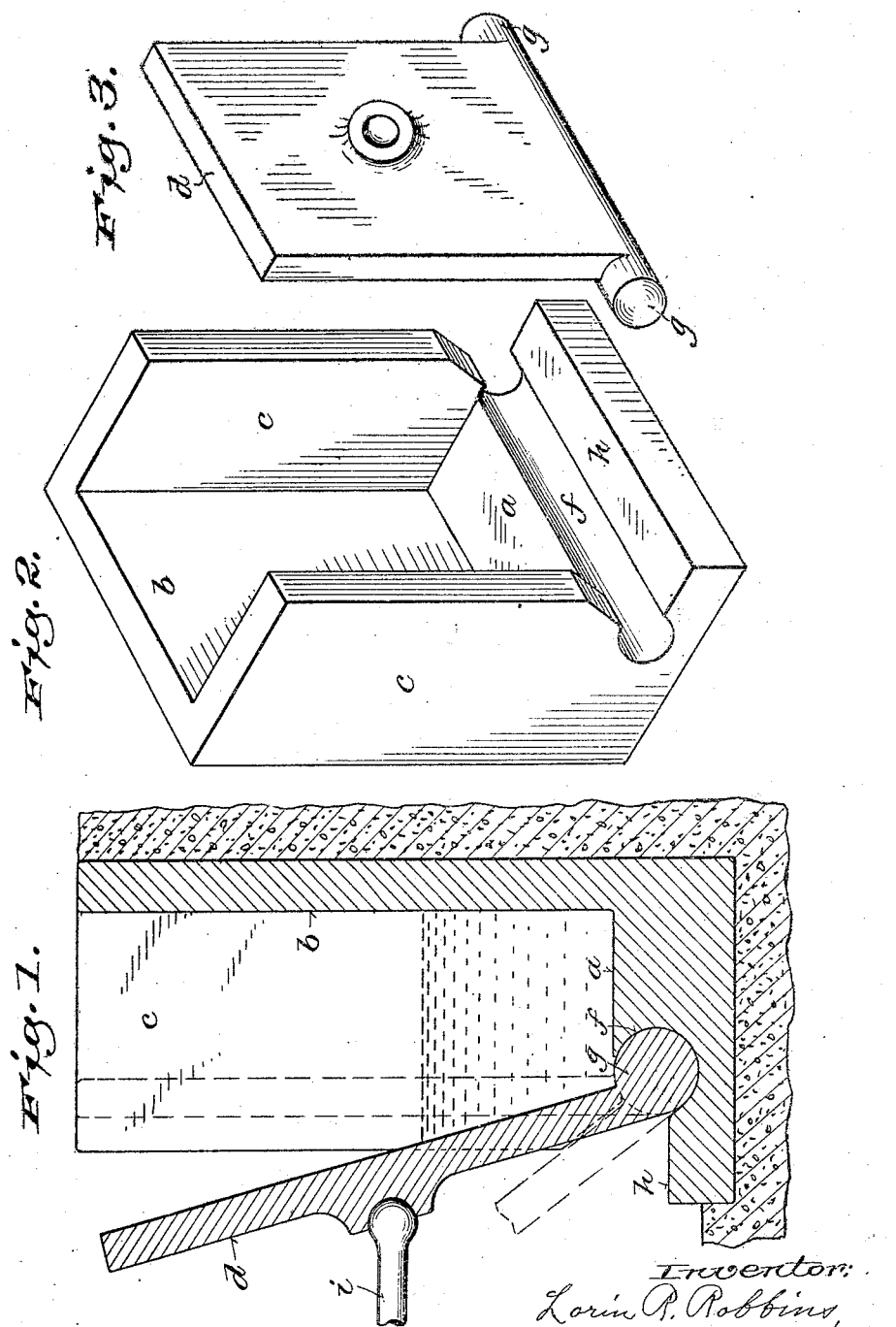
Inventor:
Lorin R. Robbins,
By Bottum, Bottum, Hudnall & Lecher
Attorneys.

Patented May 13, 1924.

1,494,021

UNITED STATES PATENT OFFICE.

LORIN ROY ROBBINS, OF MILWAUKEE, WISCONSIN.

METHOD OF AND APPARATUS FOR PRODUCING INGOTS.

Application filed April 8, 1920. Serial No. 372,125.

*To all whom it may concern:*

Be it known that I, LORIN R. ROBBINS, a citizen of the United States, residing at Milwaukee, in the county of Milwaukee and State of Wisconsin, have invented certain new and useful Improvements in Methods of and Apparatus for Producing Ingots, of which the following is a specification, reference being had to the accompanying drawing, forming a part thereof.

The main objects of this invention are to eliminate the defects in steel and other metal ingots known as "piping", "honeycombing", "segregation", "lamination", "blisters" and "fins or feather edges"; to avoid or materially reduce "cropping" and other waste and losses resulting from such defects; and generally to facilitate the production and improve the quality of ingots.

It consists in the method or process and in the construction, arrangement and combination of parts of a mold or apparatus for carrying out such method or process, as hereinafter particularly described and pointed out in the claims.

In the accompanying drawing showing a mold constructed for carrying out the method or process in accordance with the invention, like characters designate the same parts in the several figures.

Figure 1 is a vertical section of the mold from front to rear; Fig. 2 is a perspective view of the stationary member of the mold; and Fig. 3 is a similar view of the movable member.

The mold comprises a stationary member having a bottom wall $a$, a back wall $b$, and side walls $c$, which are preferably made of cast iron integrally with one another; and a movable member consisting of a front wall $d$, which is hinged at its lower end to the bottom wall of the stationary member.

For removably hinging the wall $d$ to the stationary member of the mold, the bottom wall $a$ of the stationary member is formed as shown in Fig. 2, with a transverse semi-cylindrical seat or bearing $f$, extending through the side walls $c$, and the wall $d$ is formed or provided at its lower end with a cylindrical trunnion $g$ fitting the seat or bearing $f$ and removable lengthwise therefrom. The side walls $c$ are cut away at their lower ends above the seat or bearing $f$ to permit the removal from the stationary member of the wall $d$ when it is turned down into the position indicated by dotted lines in Fig. 1.

The front side of the bottom wall of the stationary member is extended in a ledge $h$ of less thickness than the main portion of the bottom wall, to withstand the high pressure to which the movable wall $d$ is subjected in the operation of the mold.

The trunnion $g$ projects inwardly from the inner face of the wall $d$ and forms a part of the bottom of the mold cavity, as shown in Fig. 1.

The sides of the movable wall $d$ fit closely between the side walls $c$ of the stationary member, and operate with a shearing or rubbing action to remove fins, feather edges and blisters which might otherwise be produced on the sides and edges of ingots formed in the mold.

$i$ designates the plunger of a hydraulic or other power press for closing the mold and applying pressure to its contents. Any suitable power and power transmitting mechanism may be employed for the operation of the mold in carrying out the process.

The stationary member of the mold is set in a concrete or other substantial foundation, to resist the pressure to which it is subjected in operation.

In the operation of the mold in accordance with the invention, the trunnion $g$ of the movable wall $d$ being inserted in the seat or bearing $f$, engaged by the plunger $i$ and turned into position to close the lower part of the mold cavity, as shown in Fig. 1, the molten steel or other metal conveyed in a ladle into position over the mold for pouring, is drawn into the mold and as it gradually rises therein, the movable wall $d$ is gradually closed towards the back wall $b$, thereby applying pressure to the fluid or semi-fluid or plastic metal as it cools progressively from the bottom upward, the intersections of the inner face of the wall $d$ with the front edges of the side walls $c$, advancing above the rising level of the molten metal, as shown in Fig. 1.

As the molten metal in contact with the walls of the mold cools first, to a welding temperature, it forms a plastic casing for the more fluid interior portion, which as the ingot is formed is compressed with the outer plastic shell, from the bottom progressively upward. Gases generated in the molten and plastic metal and tending to form pipes and honeycombs therein, are thus gradually forced upwardly with other impurities of less specific gravity than the metal, to the surface, the pipes forming temporary vents for the escape of the gases and other impurities from the body of the metal at the surface.

During this operation, as the mold is being gradually closed and its contents is being subjected to pressure progressively from the bottom upward, the metal in the forming ingot is agitated or displaced, being forced laterally and upwardly till the movable front wall $d$ is brought to an upright position substantially parallel with the stationary back wall $b$, gases and other impurities are forced upwardly to the surface, thereby effectively avoiding the defects of piping, honeycombing, segregation and lamination in the completed ingot and the waste and losses from cropping on account of such defects, and producing an ingot of uniform density.

As the movable wall $d$ gradually closes into the stationary member of the mold, its side edges operate with a shearing or rubbing action against the front edges and inner faces of the walls $c$ to remove any fins, feather edges and blisters which would or might otherwise form on the edges and sides of the ingot.

After the ingot is completed and has cooled sufficiently to be removed from the mold, the front wall $d$ is swung backward and downward into the position indicated by dotted lines in Fig. 1 and the trunnion $g$ is then driven with a sledge hammer or forced by other suitable means lengthwise out of the seat or bearing $f$ in the stationary member of the mold, thus leaving the ingot exposed and free on the front side to be removed from the stationary member with a crowbar or by other means.

Various modifications in the construction of the mold and in the means for closing and applying pressure to the movable wall thereof, may be made without departure from the principle and scope of the invention as defined in the following claims.

I claim:

1. The method of producing ingots which consists in subjecting the metal as it is poured into an open top mold to an inward pressure gradually progressing from the bottom upward and thereby forcing gases and other impurities of less specific gravity than the metal upward to the surface of the metal while it is in a fluid or plastic condition.

2. A mold for producing ingots comprising two members, one member having bottom, back and side walls, the bottom wall being formed with a semi-cylindrical bearing extending through the side walls, and the other member consisting of a wall fitted to close between the side walls of the other member and provided at its lower end with a cylindrical trunnion fitting the bearing in the bottom wall of the other member and removable lengthwise therefrom, and means for closing the hinged member towards the back wall of the other member and applying pressure to the contents of the mold as it is filled progressing gradually upward.

3. A mold for producing ingots comprising two members, one member having stationary bottom, back and side walls, the bottom wall being formed with a transverse semi-cylindrical bearing extending through the side walls, and the other member consisting of a movable wall fitted to close between the side walls of the other member and being provided at the lower end with a cylindrical trunnion fitting said bearing and projecting inwardly from the inner face of the movable wall to form a part of the bottom wall of the mold, and means for gradually closing the movable wall of the mold and subjecting the contents thereof to gradually upward progressing pressure.

In witness whereof I hereto affix my signature.

LORIN ROY ROBBINS.